United States Patent [19]

Nohara et al.

[11] Patent Number: 5,529,636
[45] Date of Patent: Jun. 25, 1996

[54] METHOD OF CLEANING A CURING MOLD BY OXIDATION REACTION UNDER PLASMA CONDITIONS

[75] Inventors: Yoshio Nohara; Masato Yoshikawa, both of Tokyo, Japan

[73] Assignee: Bridgestone Corporation, Tokyo, Japan

[21] Appl. No.: 218,177

[22] Filed: Mar. 28, 1994

[30] Foreign Application Priority Data

Mar. 30, 1993 [JP] Japan .................................. 5-072053

[51] Int. Cl.$^6$ ........................................ B08B 7/00
[52] U.S. Cl. ........................... 134/1.1; 134/1; 134/21; 134/22.18; 134/8; 264/39; 204/192.32
[58] Field of Search .................. 134/1, 8, 21, 22.18, 134/26, 1.1; 204/192.32; 264/39, 22, 23

[56] References Cited

U.S. PATENT DOCUMENTS

| | | | |
|---|---|---|---|
| 3,091,557 | 5/1963 | Heijmans et al. | 264/39 |
| 4,486,238 | 12/1984 | Bando | 134/21 |
| 4,534,921 | 8/1985 | Fierkens et al. | 264/39 |
| 4,877,482 | 10/1989 | Knapp et al. | 134/1 X |
| 4,983,254 | 1/1991 | Fujimura et al. | 134/1 X |
| 5,034,086 | 7/1991 | Sato | 134/1 X |
| 5,147,465 | 9/1992 | Maruyama et al. | 134/1 |
| 5,176,791 | 1/1993 | Itoh et al. | 134/1 X |
| 5,240,555 | 8/1993 | Kilburn | 134/1 X |

FOREIGN PATENT DOCUMENTS

| | | |
|---|---|---|
| 0279109 | 8/1988 | European Pat. Off. . |
| 60-255405 | 12/1985 | Japan . |

*Primary Examiner*—Jan H. Silbaugh
*Assistant Examiner*—Saeed Chaudhry
*Attorney, Agent, or Firm*—Sughrue, Mion, Zinn, Macpeak & Seas

[57] ABSTRACT

A method for cleaning a curing mold to be used for manufacturing elastomer articles, and in particular a cleaning method by removing curing residual of elastomer stuck to the mold without damaging the mold. The method for cleaning the curing mold includes a process of eliminating curing residual of elastomer stuck to the mold in a treatment vessel under plasma conditions.

13 Claims, 2 Drawing Sheets

METHOD OF CLEANING A CURING MOLD BY OXIDATION REACTION UNDER PLASMA CONDITIONS

BACKGROUND OF THE INVENTION

1. Field of the Invention

The present invention relates to a method for cleaning a curing mold to be used for manufacturing elastomer articles, and in particular relates to a cleaning method by eliminating curing residual of elastomer stuck to the mold without damaging the mold.

In this specification, the term "elastomer" means rubber or rubbery elastic compound before curing by the mold, and the phrase "curing residual" means contamination of elastomer and compounded carbon black, zinc white and so on which is stuck to for example the cavity surface of the mold in the course of use in repeated curing processes.

2. Description of the Prior Art

A tire curing mold is a typical curing mold, one example of which is called an inserter mold. As described in Japanese laid-open patent specification 223108/92 (corresponding to EP-0451832), an inserter mold is made of nine or so divided molds each of which is made of many pieces, and consequently one inserter mold is composed of several hundred pieces.

An inserter mold has no air-vent, namely it is a spewless type mold due to the reason that about 80 μm clearances (slits) between the pieces fulfil the function of an air-vent.

In general, the above-mentioned curing residual stuck to such as the surface of the mold cavity, air-vent, inside of slits (clearances) and so on remains as it is, and the amount of the curing residual increases after repetition of the curing process. As curing residual stuck to the mold has an adverse influence on the quality of elastomer articles, it is necessary to remove the same. Usually, the mold is cleaned to remove curing residual at the predetermined frequency of the curing process.

The shot blast method and liquid cleaning method are known as typical methods for cleaning molds.

The shot blast method is a method for cleaning the mold by blowing plastic beads at high pressure onto the mold. The liquid cleaning method is a method for cleaning the mold by utilizing strong acid such as hydrochloric acid, sulfuric acid or nitric acid or strong alkali such as caustic soda or amine liquid of organic alkali.

There are some difficulties in the above-mentioned prior art mold cleaning methods. In the case of the shot blast method, as for curing residual stuck to the cavity surface of the mold, it is possible to clean the same by means of striking directly by blowing plastic beads at high pressure, but as for curing residual stuck to the air-vent and inside of slits (clearances) such as in a tire curing mold, plastic beads cannot reach there directly and it is impossible to eliminate the same. Moreover, the air-vent is sometimes blocked by crushed plastic beads, to prevent the passage of air. Further, as the mold is usually made of material mainly composed of aluminium, it does not have enough strength to avoid physical damage such as wear or transformation of edge portions due to impact of plastic beads, letters and marks on the mold easily become unclear, and also sharpness of pattern configuration is lost.

In particular, as mentioned before, an inserter mold has so many clearances (slits) between the pieces, the clearances are easily blocked by crushed plastic beads and projected rubber is easily stuck thereto and the clearances between mold pieces tend to become narrower due to deformed burrs (flash) at the edge portion. In the case of the shot blast method, it is very difficult to eliminate plastic beads and/or projected rubber blocked between the mold pieces. To clean an inserter mold, it is dismantled into several hundred pieces for cleaning each of them and eliminating deformed burrs (flash) at the edge portions after which all the pieces are assembled into one mold.

On the other hand, in the case of the liquid cleaning method, it is possible to eliminate more easily curing residual stuck to the air-vent and inside of slits (clearances) and there occur neither wear of mold by plastic beads nor blocking by crushed plastic beads. From these points of view, the liquid cleaning method is better than the shot blast method. However, the liquid cleaning method has other defects, namely the metal mold made of base material of aluminium is corroded by acid or alkali liquid, and amine liquid of organic alkali is not only expensive but also regulated to be hazardous materials of third class petroleums, fourth group in Japanese regulations which result in the necessity of various kinds for safety countermeasures.

An object of the present invention is to develop a method for cleaning molds by eliminating curing residual stuck to the mold surface without damaging the mold and without reducing safety and efficiency of cleaning work.

SUMMARY OF THE INVENTION

The present invention provides a method for cleaning a curing mold, by eliminating curing residual of elastomer stuck to the mold by cleaning the curing mold in a treatment vessel under plasma conditions.

More preferable conditions are as follows:

the plasma conditions are a fixed atmosphere generated by charging electric voltage between electrodes with fixed electric power after filling the treatment vessel with reacting gas;

the plasma conditions are formed by introduction of a fixed atmosphere generated by charging electric voltage between electrodes with fixed electric power after filling a plasma generating furnace with reacting gas;

the fixed atmosphere is reduced pressure atmosphere;

the reacting gas is oxygen gas;

the reacting gas is at least one halide (halogenide) gas comprising a halogen element chemically bonded with an element selected from B, C, N, S, P or Si;

the reacting gas is a mixture of halide (halogenide) gas and oxygen gas;

the fixed electric power is high frequency power;

the mold is treated by a high pressure liquid jet before and/or after eliminating curing residual under plasma conditions;

the mold is treated by ultrasonic waves before and/or after eliminating curing residual under plasma conditions;

the mold is treated by surface-active agent before and/or after eliminating curing residual under plasma conditions;

the mold is treated by a high pressure gas jet before and/or after eliminating curing residual under plasma conditions;

the mold is treated by a rotary brush before and/or after eliminating curing residual under plasma conditions;

the mold is treated by vacuum suction before and/or after eliminating curing residual under plasma conditions.

DESCRIPTION OF THE PREFERRED EMBODIMENTS

Figure 1:
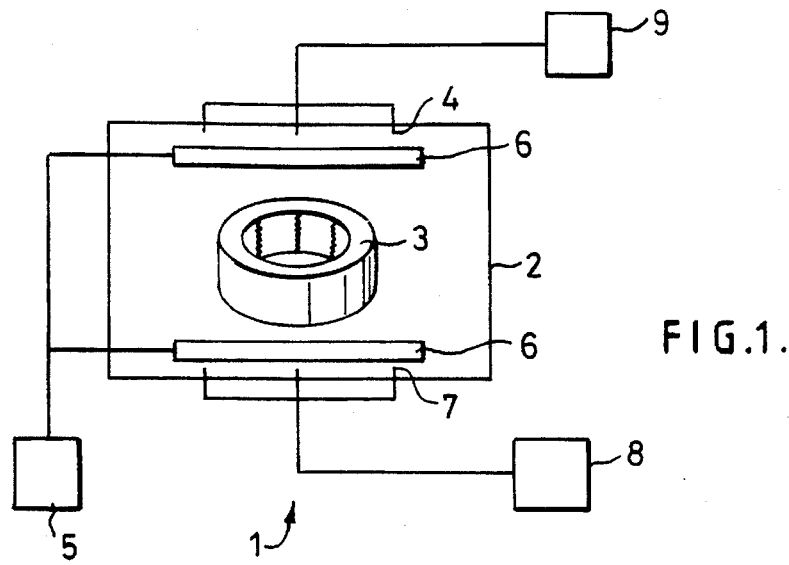
FIG. 1 is an outline view of a plasma treatment apparatus used in a first embodiment in accordance with the invention.

FIG. 1 shows typical plasma treatment apparatus in accordance with the invention in which a curing mold is installed. In the figure, reference numeral 1 indicates the plasma treatment apparatus, numeral 2 is the treatment vessel, numeral 3 is the curing mold, numeral 4 is a gas inlet, numeral 5 is a source of electric power of audio wave frequency, numeral 6 is an electrode, numeral 7 is a gas outlet, numeral 8 is a vacuum pump, and numeral 9 is a gas source.

The method in accordance with the invention using the plasma treatment apparatus 1 shown in FIG. 1 comprises cleaning a curing mold 3 by eliminating curing residual stuck to the mold by installing and cleaning the curing mold in a treatment vessel 2 under plasma conditions.

The plasma condition is a reduced pressure atmosphere generated by charging electric voltage between electrodes 6 with audio wave frequency generated by the electric power source 5 after filling the treatment vessel 2 with reacting gas through the inlet 4. The reduced pressure atmosphere is maintained by the vacuum pump 8 connected to the vessel through the gas outlet 7 and is preferably in the range of $10^{-1}$–$10^4$ Pa.

The reacting gas is preferably a mixture of oxygen gas and halide (halogenide) gas and the proportion ratio of halide gas in the mixture gas is changeable subject to balance of etching power and ashing power depending on amount and sticking degree of curing residual. Also, pure oxygen gas or pure halide gas or pure gas added with inert gas or said halide/oxygen mixture gas added with inert gas can also possibly be used as the reacting gas.

Figure 2:
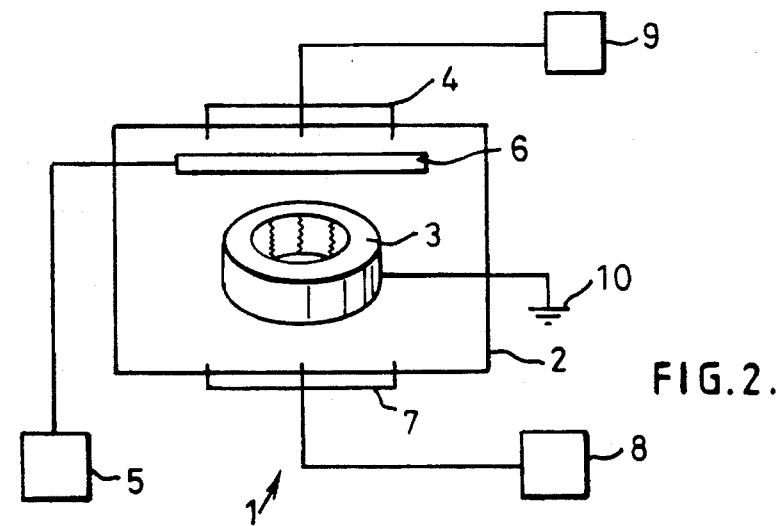
FIG. 2 is an outline view of a plasma treatment apparatus used in a second embodiment in accordance with the invention.
Figure 3:
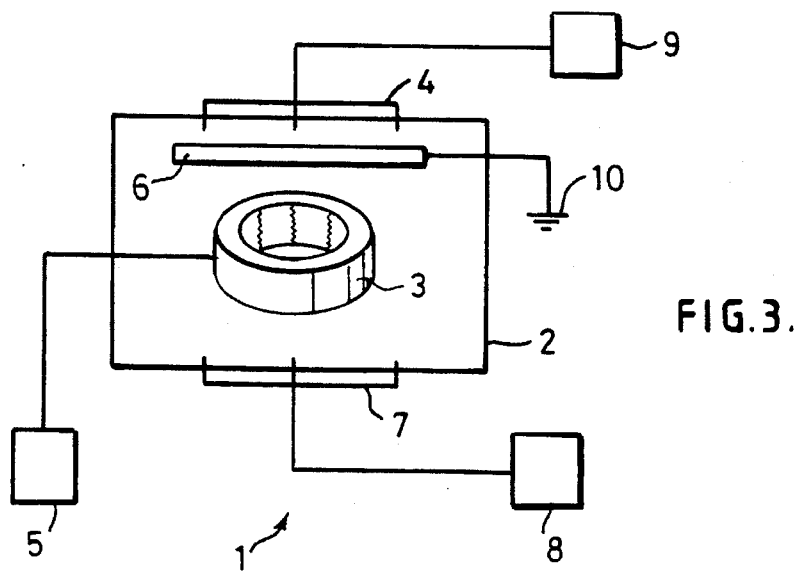
FIG. 3 is an outline view of a plasma treatment apparatus used in a third embodiment in accordance with the invention.
Figure 4:
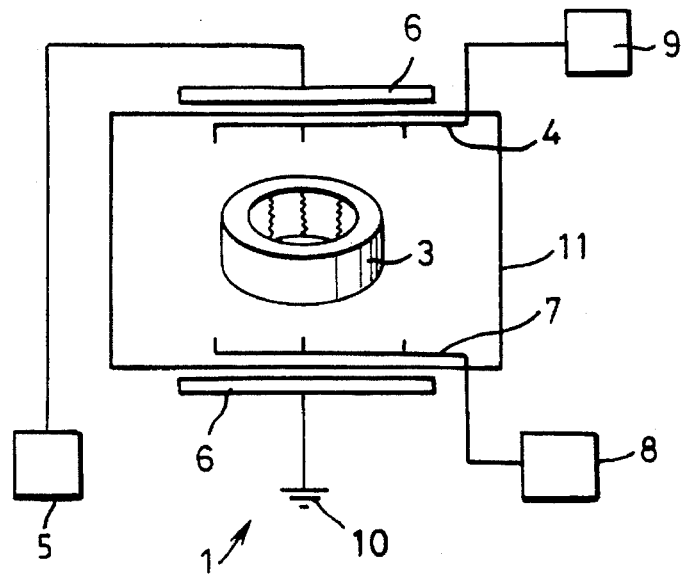
FIG. 4 is an outline view of a plasma treatment apparatus used in a fourth embodiment in accordance with the invention.
Figure 5:
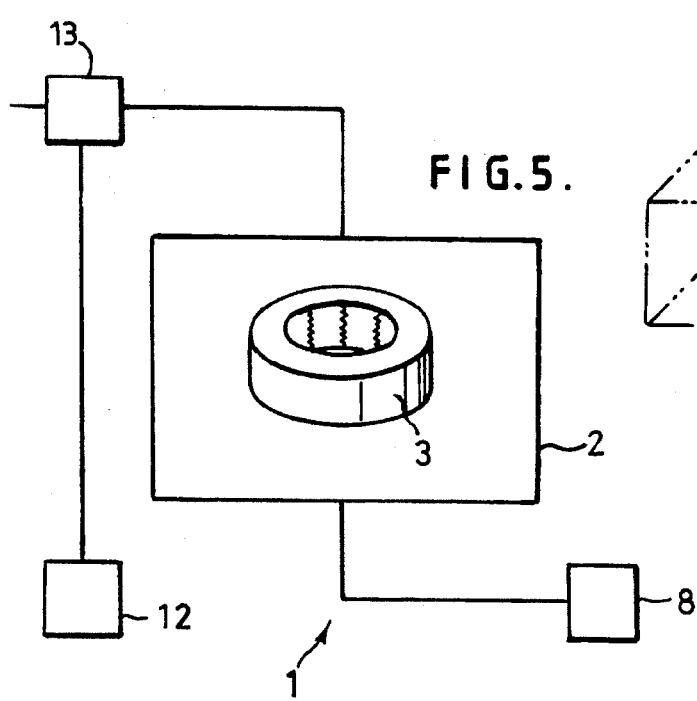
FIG. 5 is an outline view of a plasma treatment apparatus used in a fifth embodiment in accordance with the invention.

The power source for charging electric voltage between electrodes 6 may be direct current electric power if it is able to generate plasma conditions; but high frequency power is preferable, and especially an audio wave frequency electric power source 5 used in the embodiment of FIG. 1 and a micro wave frequency electric power source 12 used in the embodiment of FIG. 5 are more preferable. For audio wave frequency electric power, a frequency of 20 kHz or 13.56 MHz is favourable due to less cost and stable performance as they are widely used commercially. For the electrode structure of the plasma treatment apparatus 1 using audio wave frequency electric power, there may be used not only the structure wherein the curing mold 3 is arranged between electrodes 6 as shown in FIG. 1, but also a structure (FIG. 2) generating plasma between an earth electrode of the curing mold 3 and a counter electrode 6, a structure (FIG. 3) generating plasma between an earth electrode of a counter electrode 6 and the curing mold 3, or a structure (FIG. 4) having condensor-type (dielectric-type) or coil-type (induction-type) electrodes 6 outside an insulated treatment vessel 11; reference numeral 10 indicates ground in FIGS. 2, 3 and 4.

In the case of the microwave frequency electric power source 12 (2.45 GHz), as it is possible to introduce the plasma condition into the treatment vessel 2 after formation thereof outside the treatment vessel, the curing mold 3 is not directly exposed to plasma discharge, and therefore, compared to the mold temperature (about 200° C.) during elimination of curing residual using audio wave frequency electric power source 5, the mold temperature using microwave frequency electric power source 12 can be kept lower. If the curing mold tends to suffer from heat damage, a microwave frequency is preferable to audio wave frequency.

In accordance with the invention, it is preferable to use a cleaning method before and/or after eliminating curing residual under said plasma conditions. As the above mentioned other cleaning method, the high pressure liquid jet method, high pressure gas jet method, ultrasonic wave method, surface-active agent method, rotary brush method and vacuum suction method are suitable. By means of the above mentioned other cleaning treatment, the mold is cleaned more effectively. In the case of the high pressure liquid jet method, if water is used as the liquid, pressure of 15–25 MPa is preferable.

As shown in Table 1, in the case of a tire curing mold, the main ingredients of curing residual stuck to the mold after repeated curing are organic ingredients such as stearic acid and palmitic acid, inorganic ingredients such as zinc sulfide and other ingredients such as carbon black. After research, the inventors found that the organic ingredients of the curing residual act as adhesives for granules of carbon black and zinc sulfide to stick to the mold, and decomposition by oxidation reaction is effective for elimination of curing residual from mold. The oxidation reaction formula of each ingredient is as follows;

organic ingredient: $C_xH_y+(O)\rightarrow CO_2+H_2$     (1)

carbon black: $C+(O)\rightarrow CO_2$     (2)

zinc sulfide: $ZnS+(O)\rightarrow ZnSO_4$     (3)

Namely, according to the said oxidation reaction, organic ingredient will be decomposed into carbon dioxide and water, carbon black will become carbon dioxide, and sulfide will become water soluble zinc sulfate and, in consequence, the inventors believed the curing residual would be easily eliminated. However, according to normal oxidation reaction, the decomposition reaction did not occur below 700° C., which means normal oxidation reaction is not applicable to a mold mainly composed of low melting point material such as aluminium.

TABLE 1

| ingredients | component | weight % |
| --- | --- | --- |
| organic ingredients | stearic acid palmitic acid myristic acid aniline benzothiazole | 24% |
| inorganic ingredients | zinc sulfide | 46% |
| the others | carbon black | 30% |

According to the invention, the curing mold is not exposed to high temperature, as curing residual stuck to the mold 3 is exposed to plasma by installing and cleaning the curing mold 3 in the treatment vessel 2 under plasma conditions, and said oxidation reaction to decompose curing residual into ash occurs at relatively low temperature, that is about 200° C. which is nearly the same as curing temperature. As for curing residual stuck to the air-vent and inside of slits (clearances), according to the invention it is possible to clean the mold without operations to dismantle the mold as in the prior art. Also, if a mold cleaning process under low temperature plasma is required to avoid the mold suffering from heat damage, it is possible to introduce plasma conditions into the treatment vessel 2 after formation thereof in a plasma generator 13, as shown in the embodiment of FIG. 5. Before and/or after eliminating curing residual under said plasma conditions, there is used a cleaning method to clean the mold more effectively, for example by the high pressure liquid jet method, high pressure gas jet method, ultrasonic wave method, surface-active agent method, rotary brush method or vacuum suction method.

With reference to the drawings, the method for cleaning a curing mold according to the present invention will be explained in more detail.

Figure 6:
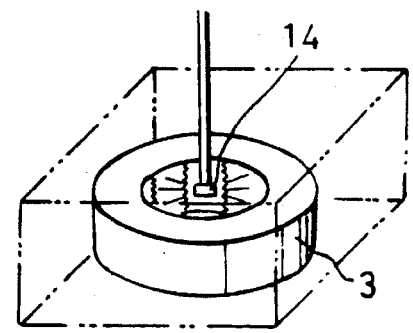
FIG. 6 is an outline view of an apparatus used in a cleaning treatment in accordance with the invention.

According to an embodiment 1, as shown in FIG. 1, a mold is cleaned by the plasma treatment apparatus 1. Curing mold 3 is installed between the electrodes 6 in the treatment vessel 2, while keeping the treatment vessel 2 under a reduced pressure atmosphere of 133 Pa by the vacuum pump 8 connected to the treatment vessel 2, oxygen gas is introduced thereto as reaction gas, and the curing mold is exposed to plasma for 30 minutes by charging electric voltage between electrodes 6 with audio wave frequency from the electric power source 5 under the condition of 13.56 MHz and 500 W. Then the mold is cleaned by water of 15 MPa pressure by means of the high pressure liquid jet method using a high pressure liquid nozzle 14 as shown in FIG. 6. The mold 3 is a die cast mold made of mainly aluminium.

In the embodiment 2, the plasma treatment apparatus as shown in FIG. 5 is used. Oxygen gas is introduced into the plasma generator as reaction gas and plasma conditions are generated by charging electric voltage between the electrodes 6 with microwave frequency generated by the electric power source 12 under the condition of 2.45 GHz and 1 kW. After introducing plasma conditions into the plasma treatment apparatus, the curing mold is exposed to plasma for 30 minutes and then cleaned by water of 15 MPa pressure by means of the high pressure liquid jet method as shown in FIG. 6. The mold 3 is a die cast mold made of mainly aluminium.

Embodiment 3 is the same as embodiment 1 except that CF₄ gas is used as reaction gas.

Embodiment 4 is the same as embodiment 1 except that a mixture of oxygen gas 90% and CF₄ gas 10% is used as reaction gas.

Embodiment 5 is the same as embodiment 1 except that the curing mold is cleaned in the air by means of the high pressure liquid jet method as shown in FIG. 6 before and after eliminating curing residual under plasma conditions.

Figure 7:
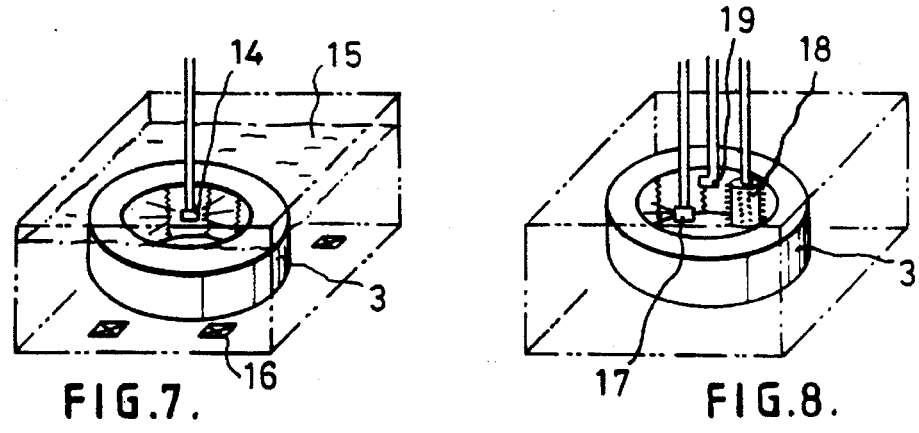
FIG. 7 is an outline view of another apparatus used in a cleaning treatment in accordance with the invention.

Embodiment 6 is the same as embodiment 1 except that the curing mold is cleaned by means of the high pressure liquid jet method in water containing surface-active agent and by the ultrasonic wave method as shown in FIG. 7, before and after eliminating curing residual under plasma conditions. In FIG. 7, reference numeral 15 indicates water containing surface active agent, and numeral 16 indicates an ultrasonic wave vibrator.

Figure 8:
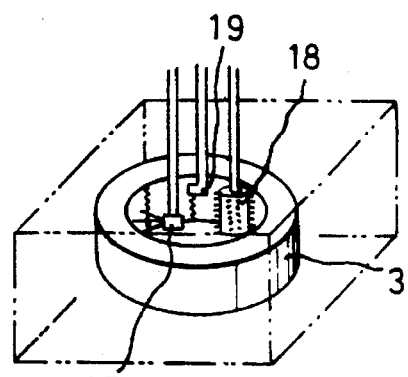
FIG. 8 is an outline view of a further apparatus used in a cleaning treatment in accordance with the invention.

Embodiment 7 is the same as embodiment 1 except that the curing mold is cleaned by means of the high pressure gas jet method, rotary brush method and vacuum suction method as shown in FIG. 8, before and after eliminating curing residual under plasma conditions. In FIG. 8, reference numeral 17 indicates a high pressure gas nozzle, numeral 18 indicates a rotary brush, and numeral 19 indicates a vacuum suction pipe.

Prior art 1 in the table that follows is the shot blast method. A mold is cleaned by blowing plastic beads at high pressure of 0.5 MPa.

Prior art 2 in the table that follows is the liquid cleaning method. A mold is cleaned by water of 15 MPa pressure by means of the high pressure liquid jet method after dipping the mold in amine liquid and swelling of curing residual.

The above cleaning methods are evaluated in view of cleaning result as well as damage of mold and safety of operation. The result of the evaluation is shown in Table 2.

TABLE 2

| | evaluation item | | | | | | |
| --- | --- | --- | --- | --- | --- | --- | --- |
| | A | B | C | D | E | F | G |
| prior art 1 | o | x | x | x | o | o | o |
| prior art 2 | o | o | x | o | x | o | x |
| embodiment 1 | o | o | o | o | o | o | o |
| embodiment 2 | o | o | o | o | o | o | o |
| embodiment 3 | o | o | o | o | o | o | o |
| embodiment 4 | o | o | o | o | o | o | o |
| embodiment 5 | o | o | o | o | o | o | o |
| embodiment 6 | o | o | o | o | o | o | o |
| embodiment 7 | o | o | o | o | o | o | o |

A: cleaning of the surface of mold cavity
B: cleaning of air-vent and inside of slits (clearances)
C: cleaning of projected rubber between the pieces
D: wear and slack of mold
E: corrosion of mold
F: thermal distortion of mold
G: safety of cleaning operation In Table 2, "o" indicates a satisfactory result, while "x" indicates an unsatisfactory result.

From the above Table 2, it is clear that the cleaning results of the embodiments in accordance with the invention are superior to those of the prior art. Also, in all the embodiments of the invention, there is no damage of the curing mold and the cleaning operation is safe.

In the above embodiments, reaction gas and exposure time to plasma is evaluated in view of colour of curing residual, index of decomposition by the oxidation reaction and mold cleaning result. The result of the evaluation is shown in Table 3. Colour of curing residual and index of decomposition by the oxidation reaction are evaluated before cleaning treatment by means of the high pressure liquid jet method. Index of decomposition by the oxidation reaction is calculated from weight difference before and after exposure to plasma. In Table 3, index of decomposition by the oxidation reaction is shown as ratio of the index, where base value 1 represents the index for 30 minutes exposure to plasma.

TABLE 3

| No. | reaction gas (volume %) | time of exposure | colour of residual | index ratio | cleaning result |
|---|---|---|---|---|---|
| 1 | O₂ gas 100% | 30 min. | grey | 1 | good |
| 2 | O₂ gas 100% | 60 min. | white | 6 | excellent |
| 3 | O₂ gas 90% CF₄ gas 10% | 30 min. | white | 6 | excellent |

The results obtained from the above Table 3 may be summarised as follows;

1: When the reaction gas is oxygen gas, colour of curing residual is grey for 30 minutes exposure to plasma and white for 60 minutes, index of decomposition by the oxidation reaction changes six times between 30 and 60 minutes exposure to plasma, and cleaning result is improved accordingly.

2: When the reaction gas is a mixture of oxygen gas 90% and CF₄ gas 10%, even if plasma exposure time is half, the cleaning result is nearly the same as that when oxygen gas only is used.

Chemical analysis shows there remain carbon black in the above grey curing residual and the above white curing residual is composed of zinc sulfate 90% and sulfur 10%.

In the above embodiments, the curing mold is cleaned by a method for cleaning under plasma conditions together with the high pressure liquid jet method. In the next embodiment, the effect of the ultrasonic wave method under water instead of the high pressure liquid jet method is examined. The reaction gas is mixture of oxygen gas 90% and CF₄ gas 10%, and the mold cleaning result depending on the plasma exposure time is tested. The results are shown in the Table 4.

TABLE 4

| | reaction gas (volume %) | exposure time (min) | cleaning result |
|---|---|---|---|
| without ultrasonic wave method | O₂ gas 90% CF₄ gas 10% | 10 min. 20 min. 30 min. | x x o |
| together with ultrasonic wave method | O₂ gas 90% CF₄ gas 10% | 10 min. 20 min. 30 min. | o o o |

The above results show that plasma exposure time is reduced to ⅓ by additionally using the ultrasonic wave method.

According to the invention, by installing and cleaning the curing mold 3 in a treatment vessel 2 under plasma conditions, exposing the curing residual stuck to the mold 3 to plasma, oxidation reaction to decompose curing residual into ash occurs at relatively low temperature, and the curing residual stuck to the mold 3 is easily eliminated. As the oxidation reaction occurs at such relatively low temperature as about 200° C., the curing mold is not exposed to high temperature and therefore does not suffer from heat damage; also, since the curing mold does not suffer from such physical or chemical damage as in the shot blast method or liquid cleaning method, mold life is increased in accordance with the invention. As for curing residual stuck in the air-vent and inside of slits (clearances) of the mold, according to the invention it is possible to clean the mold without operations of dismantling pieces of the mold and assembling them again, which is very advantageous from the viewpoint of cleaning operation efficiency, especially in case of an inserter mold composed of several hundred pieces.

Before and/or after eliminating curing residual under plasma conditions, other cleaning methods can possibly be used together such as the high pressure liquid jet method, high pressure gas jet method, ultrasonic wave method, surface-active agent method, rotary brush method and vacuum suction method to reduce plasma exposure time. The additional use of such other method together with the plasma cleaning method in accordance with the invention is beneficial from the viewpoint of time and cost.

While the invention has been particularly shown and described with reference to certain preferred embodiments thereof, it will be understood by those skilled in the art that various changes and modifications may be made without departing from the spirit and scope of the invention.

We claim:

1. A method for cleaning a tire curing aluminum mold, by eliminating curing residual of elastomer containing organic ingredients, inorganic ingredients, or carbon blacks stuck to the mold, comprising the steps of; cleaning the tire curing aluminum mold, by oxidation reaction to decompose the curing residual into ash in a treatment vessel under plasma conditions so that the oxidation reaction occurs at a relatively low temperature, wherein said plasma conditions are a fixed atmosphere generated by charging electric voltage between electrodes with fixed high frequency electric power after filling the treatment vessel with reacting gas.

2. A method for cleaning a tire curing aluminum mold, by eliminating curing residual of elastomer containing organic ingredients, inorganic ingredients, or carbon blacks stuck to the mold, comprising the steps of; cleaning the tire curing aluminum mold, by oxidation reaction to decompose the curing residual into ash in a plasma generating furnace under plasma conditions so that the oxidation reaction occurs at a relatively low temperature, wherein said plasma conditions are formed by introduction of a fixed atmosphere generated by charging electric voltage between electrodes with fixed high frequency electric power after filling said plasma generating furnace with reacting gas.

3. The method according to claim 1 or 2, wherein said fixed atmosphere is reduced pressure atmosphere.

4. The method according to claim 1 or 2, wherein said reacting gas is oxygen gas.

5. The method according to claim 1 or 2, wherein said reacting gas is at least one halide gas comprising a halogen element chemically bonded with an element selected from the group consisting of B, C, N, S, P and Si.

6. The method according to claim 1 or 2, wherein said reacting gas is a mixture of oxygen gas and a halide gas.

7. The method according to claim 1 or 2, wherein said fixed high frequency electric power is above 20 kHz.

8. The method according to claim 1 or 2, further comprising treating said mold by a high pressure liquid jet before and/or after eliminating said curing residual under said plasma conditions.

9. The method according to claims 1 or 2, further comprising treating said mold by ultrasonic waves before and/or after eliminating said curing residual under said plasma conditions.

10. The method according to claims 1 or 2, further comprising treating said mold by surface-active agent before and/or after eliminating said curing residual under said plasma conditions.

11. The method according to claims 1 or 2, further comprising treating said mold by a rotary brush before and/or after eliminating said curing residual under said plasma conditions.

12. The method according to claims 1 or 2, further comprising treating said mold by vacuum suction before and/or after eliminating said curing residual under said plasma conditions.

13. The method according to claims 1 or 2, wherein said fixed high frequency electric power is microwave power.

* * * * *